UNITED STATES PATENT OFFICE.

MARVIN LEE CHAPPELL, OF BERKELEY, CALIFORNIA.

ACID-PROOF PACKING MATERIAL.

1,102,473.  Specification of Letters Patent.  Patented July 7, 1914.

No Drawing.  Application filed September 9, 1913. Serial No. 788,959.

*To all whom it may concern:*

Be it known that I, MARVIN LEE CHAPPELL, a citizen of the United States, residing at Berkeley, in the county of Alameda and State of California, have invented certain new and useful Improvements in Acid-Proof Packing Material, of which the following is a specification.

This invention relates to that class of packing material in which an insoluble and infusible condensation product forms an essential ingredient. A condensation product of phenol and formaldehyde alone or with amin compounds is now well known in this connection, it being combined or associated with a fibrous or filamentary material, such as asbestos, and with a lubricant such as graphite, talc, soapstone and like substances, for the purpose of hardening the packing and preventing sticking.

The object of the present invention is the improvement of packing material of this general type, with respect to its resistant qualities, in order that it may be better adapted to withstand heat and chemical action, resulting from hot steam, hot gases, solvents or chemical solutions.

The condensation product, according to the present invention, is the result of a mixture of phenol, formaldehyde or its homologues, an unsaturated fatty acid, and a condensing agent. The unsaturated fatty acid can be anyone of the formula $C_nH_{2n-2}O_2$; $C_nH_{2n-6}O_2$ or $C_nH_{2n-8}O_2$, such for example as oleic, linoleic, linolenic or isolinolenic acids and the like. In this connection, oleic acid is preferred. The condensing agent may be an ammonium or other alkali salt of a sulfonic acid of any of the aromatic series, or an ammonium or other alkali salt of a fatty acid, such as mentioned. In this connection the ammonium salt of oleic acid is preferred. The proportions in which these ingredients are used may vary through a wide range. The greater the proportion of formaldehyde, the harder will be the product; so that, as the case requires, formaldehyde is added. For a specific example of such mixture with regard to its character and proportions, the following is given:—Phenol, 100 parts by weight. 95% phenol is best. Formaldehyde, 60 to 120 parts by weight. In practice, commercial formaldehyde is available. Oleic acid, 20 to 60 parts by weight. Ammonium salt of oleic acid, one to 15 parts by weight. These ingredients are mixed and heated in the general way of obtaining a condensation product. Specifically, they are heated from two to six hours, at a temperature ranging between 100 and 200 degrees centigrade, and preferably in a vessel with a reflux condenser. In due course the mass reaches the proper consistency. In this heating of the mixture, the oleic acid condenses along with the phenol and formaldehyde, the ammonium salt of said acid acting as the condensing agent. The reaction is so modified by the oleic acid as to make a chemical compound entirely different from the condensation product of phenol and formaldehyde alone or with an amin compound, and prevents the final product from becoming brittle and porous. In the first stage of the reaction there is an evolution of water as,

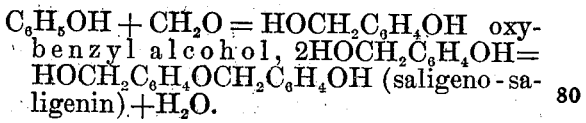

A second molecule of formaldehyde reacts with the oleic acid forming an oleic acid formaldehyde compound. This oleic acid formaldehyde compound reacts with the saligeno-saligenin with a further evolution of water, forming the final product, amber in color when reacting substances are pure.

In the manufacture of the packing material, the above mixture or condensation product may have incorporated with it pulverized graphite, mica, talc, soapstone, metallic lead or other lubricant; or again it may be used without such lubricant to impregnate a fibrous or filamentary body, such as asbestos; or, finally, it may be used as last mentioned with such lubricant. In its highest development, namely, its use with asbestos, the following is the procedure: Asbestos forms the base or body of nearly all packing material; but, when brought into contact with acids, or acid gases, such packing becomes brittle and slowly disintegrates. It will, therefore, last but a short time. It is believed that this is due to certain impurities contained in the fiber of the asbestos, which unite chemically with the acid, or acid gases when brought into contact therewith, forming the corresponding salt which tends to destroy the structure. For example, when an ordinary packing containing asbestos is used in a pump handling sulfuric acid, iron and magnesium sulfates form within the body of the packing. These cause the packing material to become brittle and slowly disintegrate. It is found, however, that these impurities or salt forming elements can be removed by a certain acid treatment, and thereby prevent the packing material from becoming brittle and disintegrating. The asbestos may be in any of the usual forms in which it is employed in this art. For this acid treatment, hydrochloric, sulfuric or nitric acid or a mixture of these is used. The following treatment is preferred: A mixture is taken of two parts by weight of commercial hydrochloric acid, and one part by weight of commercial nitric acid. To this acid mixture is added double its weight of asbestos, and then the mass is heated to 150 degrees Fahr. for eight hours. After this the asbestos is washed with water until it is free from acid, and it is then dried. It is then ready for the addition of the mixture or ingredients heretofore described as capable under treatment of resulting in the condensation product mentioned. These ingredients, as has been stated, may be either alone, or associated with pulverized graphite, mica, talc, soapstone, metallic lead or other lubricant. In any case, the said mixture is placed with the acid-treated and dried asbestos, and the mass is then treated as heretofore outlined, that is to say, it is heated from two to six hours at a temperature ranging between 100 and 200 degrees centigrade, until it reaches the proper consistency.

The word phenol as herein used is intended to include such phenolic bodies as are the equivalent of phenol, and the word formaldehyde is intended to include the polymers of formaldehyde.

What is claimed is:—

1. A packing material containing a condensation product of phenol, formaldehyde, an unsaturated fatty acid, and a condensing agent.

2. A packing material containing a condensation product of phenol, formaldehyde, an unsaturated fatty acid, and a condensing agent consisting of an alkali salt of such unsaturated fatty acid.

3. A packing material containing a condensation product of phenol, formaldehyde, oleic acid, and a condensing agent.

4. A packing material containing a condensation product of phenol, formaldehyde, oleic acid, and a condensing agent consisting of the ammonium salt of oleic acid.

5. A packing material containing a condensation product of phenol, formaldehyde, an unsaturated fatty acid, and a condensing agent, together with a lubricant.

6. A packing material containing a condensation product of phenol, formaldehyde, oleic acid, and a condensing agent consisting of the ammonium salt of oleic acid, together with a lubricant.

In testimony whereof I have signed my name to this specification in the presence of two subscribing witnesses.

MARVIN LEE CHAPPELL.

Witnesses:
Wm. F. Booth,
D. B. Richards.